United States Patent
Igarashi

(10) Patent No.: US 6,210,817 B1
(45) Date of Patent: Apr. 3, 2001

(54) STYRYL COMPOUND, PROCESS OF THE PRODUCTION THEREOF AND ORGANIC LUMINOUS ELEMENT USING THE SAME

(75) Inventor: Tatsuya Igarashi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/301,120

(22) Filed: Apr. 28, 1999

(30) Foreign Application Priority Data

Apr. 30, 1998 (JP) .................................................. 10-120842

(51) Int. Cl.$^7$ ................................ B32B 19/00; H01B 1/00
(52) U.S. Cl. .......................... 428/690; 428/461; 428/500; 428/917; 252/500; 252/511; 252/301.16; 252/301.39; 313/504; 313/506; 564/315
(58) Field of Search ..................................... 428/461, 500, 428/690, 917; 252/500, 511, 301.16, 301.35; 313/504, 506; 564/315

(56) References Cited

U.S. PATENT DOCUMENTS 5,486,441 * 1/1996 Matsushima et al. ................. 430/74
5,503,910 * 4/1996 Matsuura et al. ..................... 428/212

\* cited by examiner

Primary Examiner—Samuel A. Acquah
(74) Attorney, Agent, or Firm—Sughrue, Mion, Zinn, Macpeak & Seas, PLLC

(57) ABSTRACT

A compound containing at least two units of a structure represented by the following general formula (1):

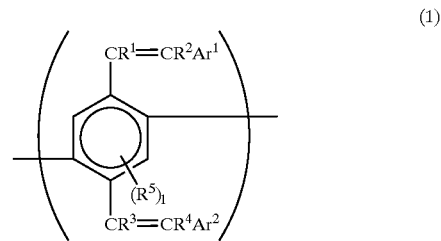

wherein $R^1$, $R^2$, $R^3$ and $R^4$ each represents a hydrogen atom or a substituent; $R^5$ represents a substituent; l is an integer of 0 to 2; and $Ar^1$ and $Ar^2$ each represents an aryl group or a heteroaryl group. Also disclosed are an organic luminous element containing such compounds, and a process for producing such compounds.

60 Claims, No Drawings

STYRYL COMPOUND, PROCESS OF THE PRODUCTION THEREOF AND ORGANIC LUMINOUS ELEMENT USING THE SAME

FIELD OF THE INVENTION

This invention relates to a conjugated compound, a process of the production thereof and an organic luminous element (particularly, an electroluminescence (EL) element) containing the same.

BACKGROUND OF THE INVENTION

In these days, researches and developments have been energetically made on various display elements using organic fluorescent materials (organic luminous elements). Among all, organic EL elements have attracted public attention as display elements with a potential capability of achieving luminescence with a high luminance at a low voltage. For example, it is reported to construct an EL element by forming an organic thin layer through deposition of organic compounds (Applied Physics Letters, vol. 51, p. 913, 1987). The organic EL elements disclosed in this report have a laminated structure of an electron-transporting material and a hole-transporting material and thus show highly improved electroluminescence characteristics compared with the conventional elements of the single-layer type.

Because of being formed by the deposition method, however, the above-mentioned EL elements suffer from difficulties in the area-enlargement and productivity. Taking these points into consideration, it has been required to establish a process for producing EL elements by the advantageous coating method. Known examples of EL element materials which can be used in producing EL elements by the coating method include paraphenylene vinylene polymers (Advanced Materials, p. 4, 1992). Although EL elements containing these conjugated polymers can achieve luminescence with a high luminance, the polymer compounds disclosed in the above literature can exclusively give green to red luminescence. To supply full-color EL elements and achieve white luminescence, it has been therefore required to develop conjugated polymer compounds capable of giving blue luminescence.

SUMMARY OF THE INVENTION

Accordingly, it is an object of the present invention to provide a compound excellent in blue luminescence.

Another object of the present invention is to provide a process of the producing the compound.

A still other object of the present invention is to provide an organic luminous element using the compound.

Other objects and effects of the present invention will become apparent from the following description.

The above-described objects of the present invention have been achieved by providing the following compounds, organic luminous elements and process.

1) A compound containing at least two units of a structure represented by the following general formula (1):

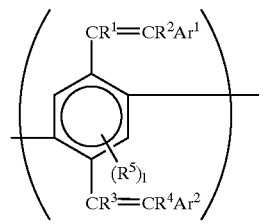

wherein $R^1$, $R^2$, $R^3$ and $R^4$ each represents a hydrogen atom or a substituent; $R^5$ represents a substituent; l is an integer of 0 to 2; and $Ar^1$ and $Ar^2$ each represents an aryl group or a heteroaryl group.

2) The compound according to the above 1), further containing at least two units of a structure represented by the following general formula (2):

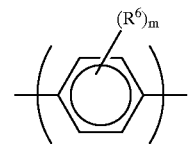

wherein $R^6$ represents a substituent; and m is an integer of from 0 to 4.

3) The compound according to the above 1), further containing at least two units of a structure represented by the following general formula (3):

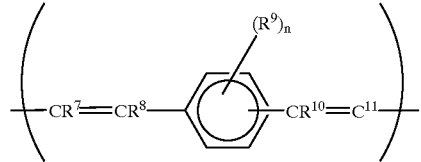

wherein $R^7$, $R^8$, $R^{10}$ and $R^{11}$ each represents a hydrogen atom or a substituent; $R^9$ represents a substituent; and n is an integer of 0 to 4.

4) The compound according to the above 1), further containing at least two units of a structure represented by following general formula (4):

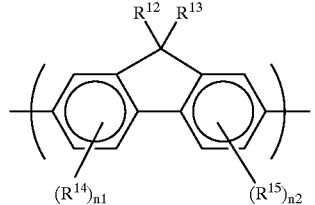

wherein $R^{12}$ and $R^{13}$ each represents a hydrogen atom or a substituent; $R^{14}$ and $R^{15}$ each represents a substituent; and n1 and n2 each is an integer of from 0 to 3.

5) The compound according to any one of the above 1), 2), 3) or 4), having soluble substituents on $Ar^1$ and $Ar^2$.

6) The compound according to any one of the above 1), 2), 3), 4) or 5) having a maximum luminescent wavelength (λmax) of the fluorescence emission spectrum of not more than 500 nm.

7) The compound according to any one of the above 1), 2), 3), 4), 5) or 6), having a weight-average molecular weight of from 1,000 to 1,000,000.

8) An organic luminous element having an organic layer which comprises at least one compound selected from:
  compounds according to any one of the above 1), 2), 3), 4), 5), 6) or 7); and
  compounds containing at least two units of a structure represented by the following general formula (a):

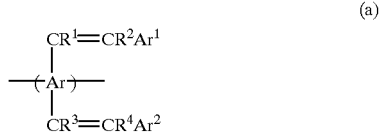

(a)

wherein $R^1$, $R^2$, $R^3$ and $R^4$ each represents a hydrogen atom or a substituent; and Ar, $Ar^1$ and $Ar^2$ each represents an aryl group or a heteroaryl group.

9) The organic luminous element according to the above 8), wherein the organic layer has a laminated structure.

10) A process for producing a styryl compound, which comprises a step of forming a carbon—carbon bond in the presence of a palladium catalyst, to thereby prepare a compound according to any one of the above 1), 2), 3), 4), 5), 6) or 7).

DETAILED DESCIRPTION OF THE INVENTION

Now, general formulae (a), (1), (2) and (3) are described below.

Ar represents a substituted or unsubstituted (provided that Ar has substituents shown in formula (a)) aryl group (preferably having from 6 to 40 carbon atoms, still preferably from 6 to 30 carbon atoms and particularly preferably from 6 to 20 carbon atoms (for example, phenyl, naphthyl, pyrenyl, diphenylamino)) or heteroaryl group (preferably containing an oxygen atom, a sulfur atom or a nitrogen atom and preferably having from 1 to 30 carbon atoms, still preferably from 2 to 12 carbon atoms (for example, pyridyl, thienyl, oxadiazolyl, triazolyl, carbazolyl)). Preferred examples thereof include substituted or unsubstituted phenyl, pyridyl and oxadiazolyl groups. Of these, substituted or unsubstituted phenyl and pyridyl groups are still preferred and a substituted or unsubstituted phenyl group is particularly preferred.

$R^1$, $R^2$, $R^3$, $R^4$, $R^7$, $R^8$, $R^{10}$ and $R^{11}$ each represents a hydrogen atom or a substituent. Examples of the substituent represented by these symbols include alkyl groups (preferably having from 1 to 20 carbon atoms, still preferably from 1 to 12 carbon atoms and particularly preferably from 1 to 8 carbon atoms (for example, methyl, ethyl, iso-propyl, tert-butyl, n-octyl, n-decyl, n-hexadecyl, cyclopropyl, cyclopentyl, cyclohexyl)), alkenyl groups (preferably having from 2 to 20 carbon atoms, still preferably from 2 to 12 carbon atoms and particularly preferably from 2 to 8 carbon atoms (for example, vinyl, allyl, 2-butenyl, 3-pentenyl)), alkynyl groups (preferably having from 2 to 20 carbon atoms, still preferably from 2 to 12 carbon atoms and particularly preferably from 2 to 8 carbon atoms (for example, propargyl, 3-pentynyl)), aryl groups (preferably having from 6 to 40 carbon atoms, still preferably from 6 to 30 carbon atoms and particularly preferably from 6 to 20 carbon atoms (for example, phenyl, p-methylphenyl, naphthyl)), substituted carbonyl groups (preferably having from 1 to 20 carbon atoms, still preferably from 1 to 16 carbon atoms and particularly preferably from 1 to 12 carbon atoms (for example, acetyl, benzoyl, methoxycarbonyl, phenyloxycarbonyl, dimethylaminocarbonyl, phenylaminocarbonyl)), amino groups (preferably having from 0 to 20 carbon atoms, still preferably from 1 to 16 carbon atoms and particularly preferably from 1 to 12 carbon atoms (for example, dimethylamino, methylcarbamoyl, ethylsulfonylamino, dimethylaminocarbonylamino, phthalimido)), sulfonyl groups (preferably having from 1 to 20 carbon atoms, still preferably from 1 to 16 carbon atoms and particularly preferably from 1 to 12 carbon atoms (for example, mesyl, tosyl)), a sulfo group, a carboxyl group, heterocycles (preferably containing an oxygen atom, a sulfur atom or a nitrogen atom and preferably having from 1 to 30 carbon atoms, still preferably from 1 to 16 carbon atoms and particularly preferably from 2 to 12 carbon atoms (for example, imidazolyl, pyridyl, furyl, piperidyl, morpholino, benzoxazolyl, triazolyl)), a hydroxyl group, alkoxy groups (preferably having from 1 to 20 carbon atoms, still preferably from 1 to 16 carbon atoms and particularly preferably from 1 to 12 carbon atoms (for example, methoxy, benzyloxy)), aryloxy groups (preferably having from 6 to 20 carbon atoms, still preferably from 6 to 16 carbon atoms and particularly preferably from 6 to 12 carbon atoms (for example, phenoxy, naphthyloxy)), halogen atoms (preferably fluorine, chlorine, bromine and iodine atoms), a thiol group, alkylthio groups (preferably having from 1 to 20 carbon atoms, still preferably from 1 to 16 carbon atoms and particularly preferably from 1 to 12 carbon atoms (for example, methylthio)), arylthio groups (preferably having from 6 to 20 carbon atoms, still preferably from 6 to 16 carbon atoms and particularly preferably from 6 to 12 carbon atoms (for example, phenylthio)), and a cyano group. These substituents may be further substituted.

It is preferred that $R^1$, $R^2$, $R^3$, $R^4$, $R^7$, $R^8$, $R^{10}$ and $R^{11}$ each represents a hydrogen atom, a cyano group, a substituted or unsubstituted alkyl, aryl group or heteroaryl group (preferably having from 1 to 30 carbon atoms, still preferably from 2 to 12 carbon atoms (for example, pyridyl, thienyl)), a substituted carbonyl group or a halogen atom. Still preferred examples thereof include a hydrogen atom, a cyano group and an alkyl group and a hydrogen atom is particularly preferred.

$R^5$, $R^6$ and $R^9$ each represents a substituent, and examples thereof include those exemplified for $R^1$. Preferred examples thereof include substituted or unsubstituted alkyl groups, alkoxy groups, halogen atoms, aryl groups, heteroaryl groups and a cyano group. Still preferred examples thereof include alkyl groups and alkoxy groups, and alkoxy groups are particularly preferred.

l is an integer of from 0 to 2. When l is 2, then a plurality of $R^5$ groups may be either the same or different from each other. It is preferred that l is 0. m is an integer of from 0 to 4. When m is 2 or more, then a plurality of $R^6$ groups may be either the same or different from each other. It is preferred that m is from 0 to 2, still preferably 0. n is an integer of from 0 to 4. When n is 2 or more, then a plurality of $R^9$ groups may be either the same or different from each other. It is preferred that n is from 0 to 2, still preferably 0.

$Ar^1$ and $Ar^2$ are each a substituted or unsubstituted aryl group (preferably having from 6 to 40 carbon atoms, still preferably from 6 to 30 carbon atoms and particularly preferably from 6 to 20 carbon atoms (for example, phenyl, naphthyl, pyrenyl, diphenylaminophenyl)) or a substituted or unsubstituted heteroaryl group (preferably having from 1 to 30 carbon atoms, still preferably from 2 to 12 carbon atoms (for example, pyridyl, thienyl, oxadiazolyl, triazolyl, carbazolyl)) Preferred examples thereof include substituted or unsubstituted phenyl, pyridyl, oxadiazolyl, naphthyl and carbazolyl groups and still preferred examples thereof include substituted or unsubstituted phenyl, pyridyl and oxadiazolyl groups. A substituted or unsubstituted phenyl group is particularly preferred.

The compound of the present invention contains at least two units of the structure represented by formula (1). The number of the units represented by formula (1) contained in the compound is preferably 3 or more, more preferably 5 or more.

In a preferred embodiment, the compound of the present invention further contains at least two units of a structure represented by formula (2) or contains at least two units of a structure represented by formula (3).

Furthermore, compounds containing at least two units of a structure represented by the following general formula (5) are preferred.

$R^{14}$ and $R^{15}$ are each more preferably an alkyl group or a aryl group, and particularly preferably an alkyl group.

n1 and n2 each is an integer of from 0 to 3, preferably from 0 to 1, and more preferably 0.

It is preferred that the compounds of the present invention have a λmax (the maximum luminescent wavelength) of the fluorescence emission spectrum of not more than 500 nm, more preferably from 350 to 500 nm, still preferably from 350 to 480 nm and particularly preferably from 400 to 470 nm.

The compounds of the present invention are preferably polymer compounds, still preferably conjugated polymer compounds having a conjugated chain on the main polymer chain. The compounds of the present invention preferably have a weight-average molecular weight (on the polystyrene conversion basis) of form 1,000 to 1,000,000, still preferably from 3,000 to 100,000 and particularly preferably from 5,000 to 50,000. The terminal end of the polymer compound of the present invention may be inactivated, in other words, has an end-capped structure.

(5)

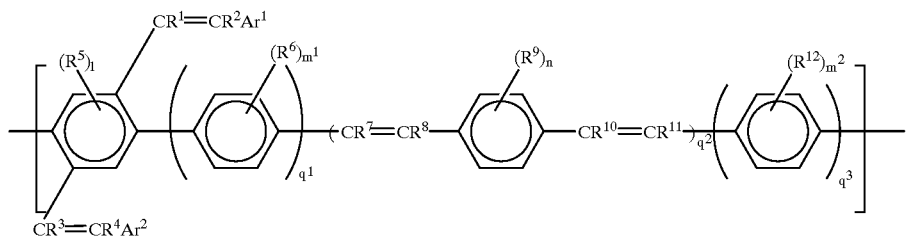

In the above general formula, $m^1$ and $m^2$ each has the same meaning as m defined above; $R^{12}$ has the same meaning as $R^6$ defined above; and $q^1$, $q^2$ and $q^3$ each is an integer of 0 or more. It is preferred that $q^1$ and $q^3$ each is from 0 to 20, still preferably from 1 to 10 and particularly preferably from 1 to 3. It is preferred that $q^2$ is from 0 to 5, still preferably from 0 to 1 and particularly preferably 0.

In addition, compounds containing at least two units of a structure represented by formula (1) and further containing at least two units of a structure represented by formula (4) are also preferred in the present invention.

In formula (4), $R^{12}$ and $R^{13}$ each represents a hydrogen atom or a substituent, and the examples of the substituent represented by these symbols include those exemplified for $R^1$. Preferred examples of $R^{12}$ and $R^{13}$ include hydrogen atom, alkyl groups, aryl groups, alkenyl groups and alkynyl groups. $R^{12}$ and $R^{13}$ are each more preferably a hydrogen atom or an alkyl group, and particularly preferably an alkyl group.

$R^{14}$ and $R^{15}$ each represents a substituent, and the examples thereof include those exemplified for $R^1$. Preferred examples thereof include alkyl groups, aryl groups, alkenyl groups, alkynyl groups, alkoxy groups and a cyano group.

It is preferred that the compounds of the present invention have soluble substituent(s) preferably on $Ar^1$ and $Ar^2$. The term "soluble substituent" as used herein means a substituent which is used for imparting to the main polymer chain a solubility in organic solvents. Such a soluble substituent preferably has from 4 to 30 carbon atoms, still preferably from 6 to 20 carbon atoms and particularly preferably from 8 to 18 carbon atoms. Examples thereof include 2-ethylhexyl, isobutyl, octadecy, t-octyl, methoxyethoxyethoxy, i-$C_{18}H_{37}$ and diisobutylamino groups. Preferred examples of the soluble substituent include those containing at least one asymmetric point and those containing at least one oxygen, sulfur or nitrogen atom. Of these, still preferred soluble substituents are those having at least one asymmetric point and those containing at least one oxygen atom.

Specific examples of the compounds of the present invention are shown below, but the invention is not limited thereto. The weight-average molecular weights (Mw) of the compounds in terms of polystyrene are also shown therein.

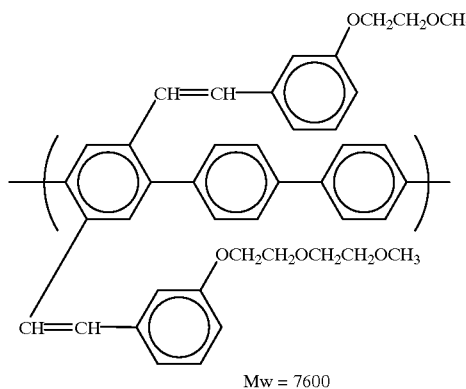
(1-1)
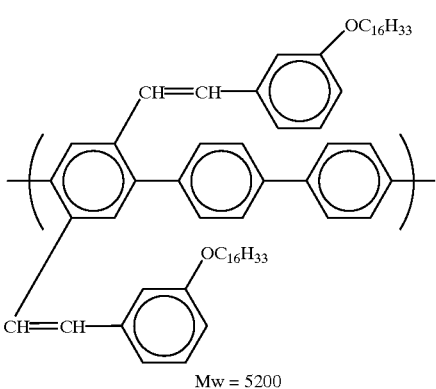
(1-2)
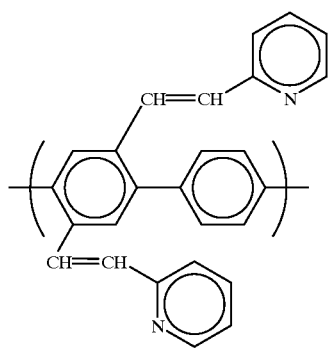
(1-3)
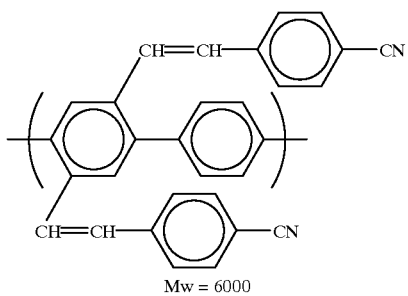
(1-4)
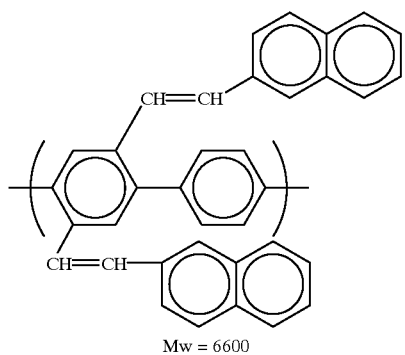
(1-5)
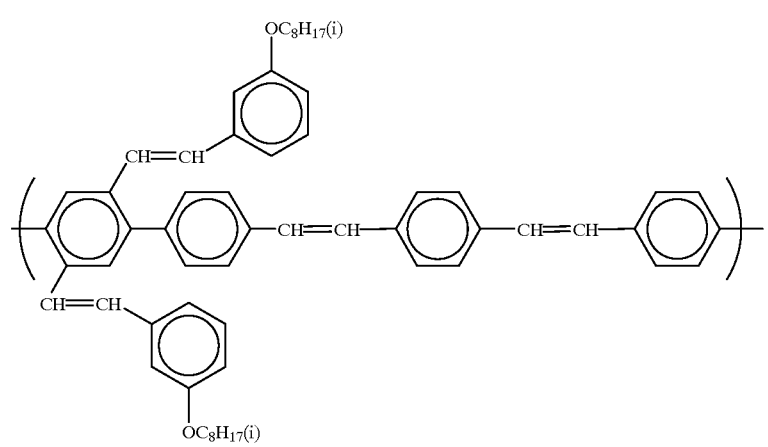
(1-6)

-continued
(1-7)
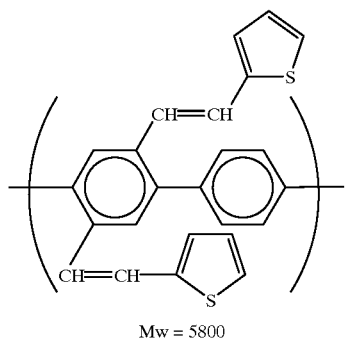
(1-8)
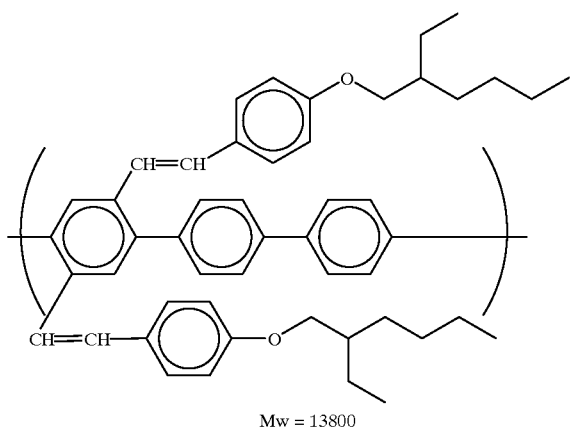
(1-9)
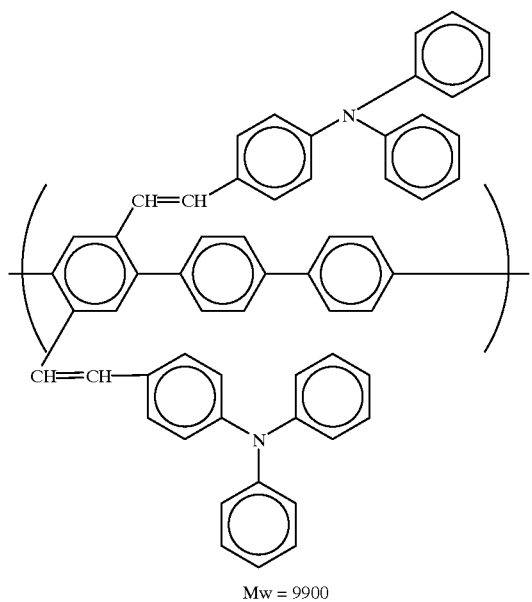
(1-10)
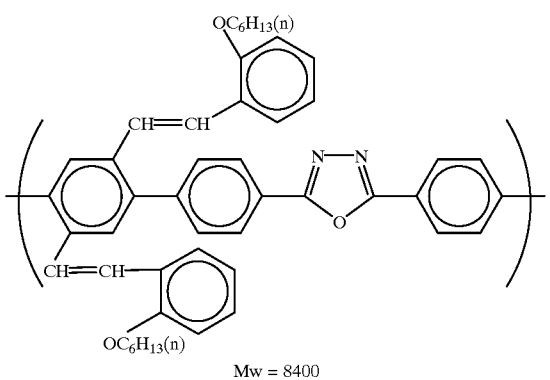
(1-11)
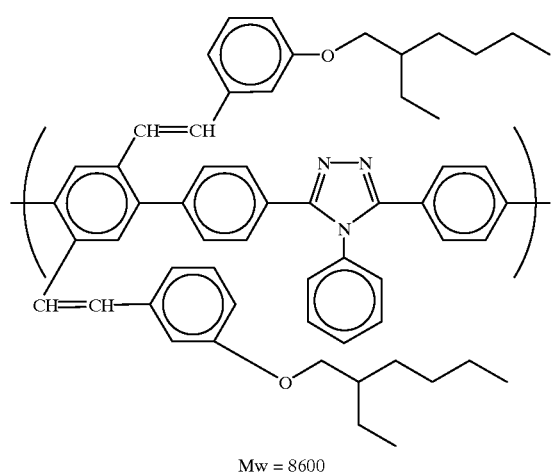
(1-12)
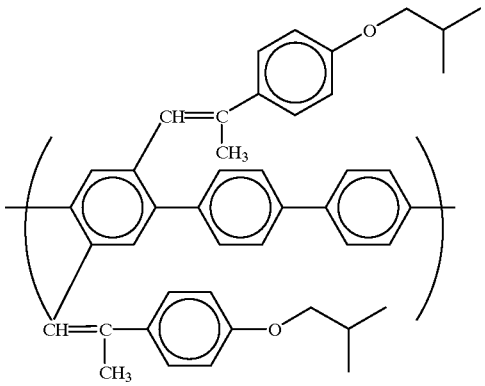

-continued
(1-13)
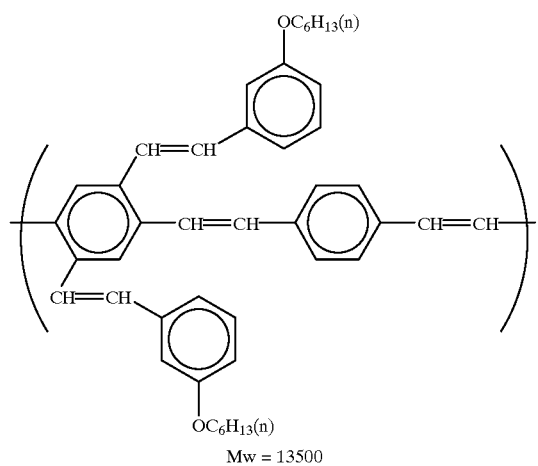
(1-14)
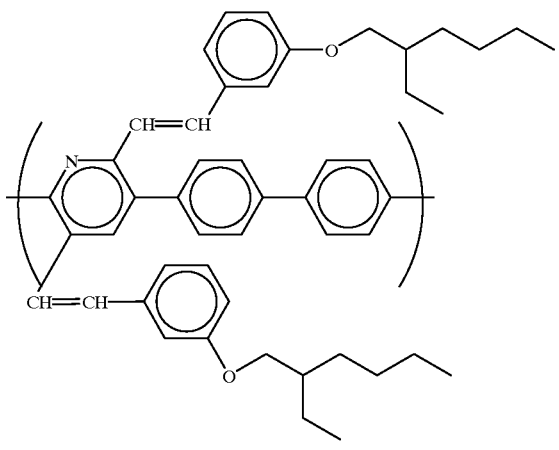
(1-15)
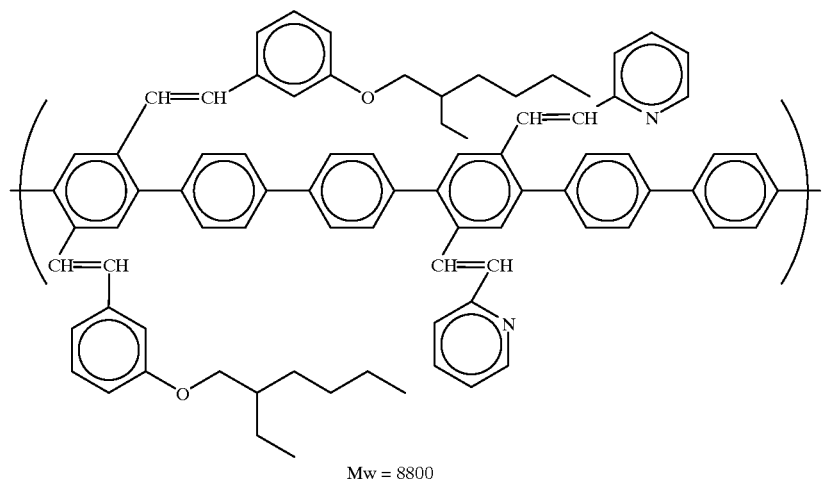
(1-16)
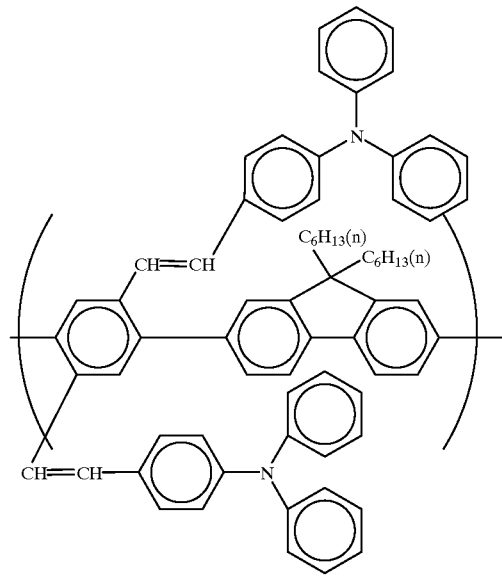
(1-18)
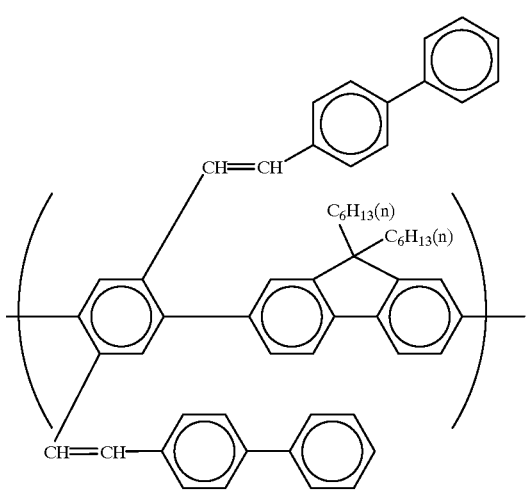

Next, the process for producing the compounds of the present invention is described below. The compounds of the present invention can be synthesized by various methods, for example, a synthesis (polymerization) method which comprises homocoupling an aryl halide in the presence of a nickel or copper catalyst to thereby form carbon-carbon bonds; a synthesis (polymerization) method which comprises reacting an aryl halide derivative with a vinylbenzene derivative in the presence of a palladium catalyst to thereby form carbon—carbon bonds; a polymerization method which comprises reacting and coupling a boric acid derivative or a boric acid ester derivative with an aryl halide derivative or an aryl triflate derivative in the presence of a palladium catalyst to thereby form carboncarbon bonds; and a synthesis (polymerization) method which comprises reacting alkyl halide derivatives with each other in the presence of a base to thereby form carbon—carbon bonds. Of theses, it is preferred to use a synthesis (polymerization) method in which carbon—carbon bonds are formed in the presence of a palladium catalyst. It is still preferred to use a method in which a boric acid derivative and an aryl halide derivative are polymerized in the presence of a palladium catalyst.

Examples of the boric acid derivative include substituted or unsubstituted arylboric acid derivatives (for example, 1,4-phenyldiboric acid, 4,4'-biphenyldiboric acid) and substitued or unsubstituted heteroarylboric acid derivatives (for example, pyridyldiboric acid). Examples of the boric acid ester derivative include substituted or unsubstituted arylboric acid ester derivatives (for example, pinacol phenyldiborate) and substituted or unsubstituted heteroarylboric acid ester derivatives (for example, pinacol pyridyldiborate).

Preferred example of the halogen atom in the aryl halide derivative are chlorine, bromine and iodine atoms. A bromine atom is particularly preferred therefor. Examples of the aryl halide derivative include dibromobenzene derivatives and dibromobiphenyl derivatives. Examples of the aryl triflate derivative include ditrifluoromethanesulfonylbenzene derivatives.

Examples of the vinylbenzene derivative include divinylbenzene and 4,4'-divinylbiphenyl. Examples of the alkyl halide derivative include 1,4-bischloromethylbenzene and 4,4'-bisbromomethylbenzene.

Examples of the palladium catalyst are not particularly limited, but include, for example, palladium tetrakistriphenylphosphine, palladium carbon and palladium dichloride (dppf) (dppf; 1,1'-bisdiphenylphosphinoferrocene). It is also possible to add a ligand such as triphenylphospine simultaneously therewith.

It is preferred to use a base in the above-mentioned reactions. Examples of the base for use therein include sodium carbonate, sodium acetate and triethylamine, though the present invention is not restricted thereto. Although the amount of the base employed is not particularly restricted too, it is preferred to use the base in an amount of from 0.1 to 20 equivalents, still preferably from 1 to 10 equivalents to the boric acid (ester) site.

It is preferred to use a solvent in the above-mentioned reactions. Examples of the solvent for use therein include ethanol, water, ethylene glycol dimethyl ether, diethylene glycol dimethyl ether, dimethylformamide, toluene, tetrahydrofuran and mixtures thereof, though the present invention is not restricted thereto.

Next, the organic luminous element containing the compound of the present invention is illustrated below.

The organic luminous elements of the present invention can be used without particular distinction of the system, the driving method and the form of utilization, as long as they are elements in which the compound of the present invention is utilized. However, elements are preferred in which luminescence from the compound of the present invention is utilized, or in which the compound of the present invention is utilized as an electron-transporting material. Typical examples of the organic luminous element include organic EL (electroluminescence) elements.

The organic EL element containing the compound of the present invention is illustrated below.

The organic layer of the EL element containing the compound of the present invention may be formed by arbitrary methods without restriction. For example, use may be made therefor of resistance heating deposition methods, electron beam methods, sputtering methods, molecular lamination methods, coating methods, etc. When the characteristics of the elements and the production thereof are taken into consideration, it is preferred to employ the resistance heating deposition method or the coating method. Of these, the coating method is still preferred.

The luminescence element of the present invention comprises a pair of electrodes, namely, an anode and a cathode, and has an organic layer formed between the electrodes. The organic layer is a luminescence layer or a plurality of organic compound thin layers including a luminescence layer. In addition to the luminescence layer, the element may have additional layers (either organic or inorganic layers), for example, a hole-injecting layer, a hole-transporting layer, an electron-injecting layer, an electron-transporting layer, a protective layer, etc. Alternatively, these layers may also have other functions. Various materials may be used to form each of these layers.

An example of the laminated structure of the luminescence element according to the present invention is one comprising a hole-injecting layer, a hole-transporting layer, a luminescence layer, an electron-transporting layer and an electron-injecting layer. It is also possible that a single compound serves as two or more layers. Although the constitution of the layers is not particularly limited, a preferred example of the structure of the element is one having the hole-injecting layer, the hole-transporting layer, the luminescence layer, the electron-transporting layer and the electron-injecting layer in this order.

The anode, which supplies holes to the hole-injecting layer, the hole-transporting layer, the luminescence layer, etc., may be made of metals, alloys, metal oxides, electrically conductive compounds or mixtures thereof. It is preferred to use a material having a work function of 4 eV or more as the anode. Particular examples thereof include electrically conductive metal oxides (for example, tin oxide, zinc oxide, indium oxide, indium tin oxide (ITO)), metals (for example, gold, silver, chromium, nickel), mixtures or laminates of these metals with these electrically conductive metal oxides, inorganic electrically conductive materials (for example, copper iodide, copper sulfide), organic electrically conductive materials (for example, polyaniline, polythiophene, polypyrrole) and laminates of these materials with ITO. It is preferred to use electrically conductive metal oxides. Of these, ITO is particularly preferred from the viewpoints of productivity, electrical conductivity, transparency, etc. The film thickness of the anode may be appropriately selected depending on the material employed. In usual, it preferably ranges from 10 nm to 5 $\mu$m, still preferably from 50 nm to 1 $\mu$m and particularly preferably from 100 nm to 500 nm.

As the anode, use is usually made of one which comprises a layer formed on a substrate made of soda-lime glass, non-alkali glass, a transparent resin, etc. When a glass is used, it is preferred to use non-alkali glass so as to minimize the ion elution therefrom. When soda-lime glass is to be used, it is preferred to form a barrier coating made of silica, etc. thereon. The thickness of the substrate is not particularly limited, so long as a sufficient mechanical strength can be maintained thereby. In the case of a glass substrate, the thickness is usually at least 0.2 mm, preferably at least 0.7 mm.

The anode may be formed by various methods selected depending on the material employed. In the case of ITO, for example, the film may be formed by using the electron beam method, the sputtering method, the resistance heating deposition method, the chemical reaction method (for example, the sol-gel method) or the coating method with the use of an indium oxide dispersion. It is also possible to lower the driving voltage of the anode or to elevate the luminescence efficiency thereof by washing, etc. In the case of ITO, for example, favorable effects can be established after performing an UV-ozone treatment, a plasma treatment, etc.

The cathode, which supplies electrons to the electron-injecting layer, the electron-transporting layer, the luminescence layer, etc., can be selected with considering the adhesion to the layers adjacent thereto (for example, the electron-injecting layer, the electron-transporting layer, the luminescence layer), ionization potential, stability, etc. Examples of the cathode material include metals, alloys, metal halides, metal oxides, electrically conductive compounds or mixtures thereof. Specific examples thereof include alkali metals (for example, Li, Na, K) and fluorides thereof, alkaline earth metals (for example, Mg, Ca) and fluorides thereof, gold, silver, lead, aluminum, sodium-potassium alloy and mixtures of these metals, lithium-aluminum alloy and mixtures of these metals, magnesium-silver alloy and mixtures of these metals and rare earth metals (for example, indium, ytterbium). It is preferred to use a material having a work function of 4 eV or more as the cathode. Particularly preferred examples thereof include aluminum, lithium-aluminum alloy and mixtures of these metals, and magnesium-silver alloy and mixtures of these metals. The cathode may have either a single-layer structure comprising the above-mentioned compound or a mixture thereof, or a laminated structure containing the same. The film thickness of the cathode may be appropriately selected depending on the material employed. In usual, it preferably ranges from 10 nm to 5 $\mu$m, still preferably from 50 nm to 1 $\mu$m and particularly preferably from 100 nm to 1 $\mu$m.

The anode may be formed by using the electron beam method, the sputtering method, the resistance heating deposition method, the coating method, etc. Although a single metal may be deposited, it is also possible to deposit two or more components at the same time. Moreover, it is possible to deposit two or more metals at the same time to form an alloy cathode. Alternatively, an alloy which has been preliminarily prepared may be subjected to the deposition.

Lower sheet resistances of the anode and the cathode are more desirable. Namely, sheet resistances of several hundred Ω/square or less are preferred.

The luminescence layer may be made of an arbitrary material, so long as the layer thus formed can exert the function of, upon the application of an electrical field, injecting holes from the anode, the hole-injecting layer or the hole-transporting layer, and in addition, injecting electron from the cathode, the electron-injecting layer or the electron-transporting layer, the function of transporting the thus injected charges, and the function of allowing the re-binding of holes to electrons thus causing luminescence. It is preferred that the luminescence layer contains the compounds of the present invention, though other luminescent materials may be also used. Examples thereof include metal complexes of benzoxazole derivatives, benzimidazole derivatives, benzthiazole derivatives, styrylbenzene derivatives, polyphenyl derivatives, diphenylbutadiene derivatives, tetraphenylbutadiene derivatives, nephthalimide derivatives, coumarin derivatives, perylene derivatives, perynone derivatives, oxadiazole derivatives, aldazine derivatives, pyraridine derivatives, cyclopentadiene derivatives, bisstyrylanthracene derivatives, quinacridone derivatives, pyrrolopyridine derivatives, thiadiazolopyridine derivatives, cyclopentadiene derivatives, styrylamine derivatives, aromatic dimethylidyne compounds and 8-quinolinol derivatives and polymer compounds such as polythiophene, polyphenylene and polyphenylene vinylene. Although the film thickness of the luminescence layer is not particularly limited, it preferably ranges usually from 1 nm to 5 $\mu$m, still preferably from 5 nm to 1 $\mu$m and particularly preferably from 10 nm to 500 nm.

The luminescence layer may be formed by an arbitrary method without restriction. For example, it may be formed by using the resistance heating deposition method, the electron beam method, the sputtering method, the molecular lamination method, the coating methods (for example, spin coating, casting, dip coating) or the LB method. Among these methods, it is preferred to use the resistance heating deposition method or the coating methods.

The hole-injecting layer and the hole-transporting layer may be made of an arbitrary material, so long as it has a function of injecting holes from the anode, transporting holes or barring electrons injected from the cathode. Specific examples of such materials include electrically conductive high-molecular weight oligomers (for example, carbazole derivatives, triazole derivatives, oxazole derivatives, oxadiazole derivatives, imidazole derivatives, polyarylalkane derivatives, pyrazoline derivatives, pyrazolone derivatives, phenylenediamine derivatives, arylamine derivatives, amino-substituted chalcone derivatives, styrylanthracene derivatives, fluorenone derivatives, hydrazone derivatives, stilbene derivatives, silazane derivatives, aromatic tertiary amine compounds, styrylamine compounds, aromatic dimethylidyne compounds, porphyrin compounds, polysilane compounds, poly(N-vinylcarbazole) derivatives, aniline copolymers, thiophene oligomers, polythiophene) and the compounds of the present invention. The film thickness of the holeinjecting layer or the hole-transporting layer is not particularly limited. In usual, it preferably ranges from 1 nm to 5 $\mu$m, still preferably from 5 nm to 1 $\mu$m and particularly preferably from 10 nm to 500 nm. The hole-injecting layer and the hole-transporting layer each may have a single-layer stricture comprising one or more materials as cited above. Alternatively, they may have a layered structure composed of a plurality of layers which may be either the same or different from each other in their compositions.

The hole-injecting layer and the hole-transporting layer may be formed by the vacuum deposition method or the LB method or by coating (for example, spin coating, casting, dip coating) with a solution or a dispersion of the above-mentioned hole-injection/transport agent in a solvent. When the coating method is employed, it is also possible to dissolve or disperse a resin component in the coating liquor. Examples of the resin component include polyvinyl chloride, polycarbonate, polystyrene, polymethyl methacrylate, polybutyl methacrylate, polyester, polysulfone, polyphenylene oxide, polybutadiene, poly(N- vinylcarbazole), hydrocarbon resin, ketone resin, phenoxy resin, polyamide, ethyl cellulose, vinyl acetate, ABS resin, polyurethane, melamine resin, unsaturated polyester resin, alkyd resin, epoxy resin and silicone resin.

The electron-injecting layer and the electron-transporting layer may be made of an arbitrary material, so long as it has a function of injecting electrons from the cathode, transporting electrons or barring holes injected from the anode. Specific examples of such materials include various metal complexes typified by metal complexes of heterocyclic tetracarboxylic anhydrides (for example, triazole derivatives, oxazole derivatives, oxadiazole derivatives, fluorenone derivatives, anthraquinodimethane derivatives, anthrone derivatives, diphenylquinone derivatives, thiopyrazine dioxide derivatives, carbodiimide derivatives, fluorenylidenemethane derivatives, distyrylpyrazine derivatives, naphthalene perylene), phthalocyanine derivatives and 8-quinolinol derivatives and metal complexes carrying metal phthalocyanine, bonzoxazole or benozothiazole as a ligand, and the compounds of the present invention. The film thickness of the electron-injecting layer or the electron-transporting layer is not particularly limited. In usual, it preferably ranges from 1 nm to 5 $\mu$m, still preferably from 5 nm to 1 $\mu$m and particularly preferably from 10 nm to 500 nm. The electron-injecting layer and the electron-transporting layer may have a single-layer stricture comprising one or more materials as cited above. Alternatively, they may have a layered structure composed of a plurality of layers which may be either the same or different from each other in their compositions.

The electron-injecting layer and the electron-transporting layer may be formed by the vacuum deposition method or the LB method or by coating (for example, spin coating, casting, dip coating) with a solution or a dispersion of the above-mentioned electron-injection/transport agent in a solvent. When the coating method is employed, it is also possible to dissolve or disperse a resin component in the coating liquor. Examples of the resin component include those as cited above with respect to the hole-injecting layer.

The protective layer may be made of any material, so long as it can protect the element from the invasion of substances (for example, moisture, oxygen) accelerating the deterioration of the element. Specific examples thereof include metals (for example In, Sn, Pb, Au, Cu, Ag, Al, Ti, Ni), metal oxides (for example, MgO, SiO, SiO$_2$, Al$_2$O$_3$, GeO, NiO, CaO, BaO, Fe$_2$O$_3$, Y$_2$O$_3$, TiO$_2$), metal fluorides (for example, MgF$_2$, LiF, AlF$_3$, CaF$_2$), polyethylene, polypropylene, polymethyl methacrylate, polyimide, polyurea, polytetrafluoroethylene, polychlorotrifloroethylene, polydichlorodifluoroethylene, chlorotrifluoroethylene-dichlorodifluoroethyelen copolymer, copolymers obtained by copolymerizing a monomer mixture containing tetrafluoroethylene together with at least one comonomer, fluorine-containing copolymers having a cyclic structure in the main copolymer chain, water-absorbing materials having a degree of water absorption of 1% or more, and water-proofing materials having a degree of water absorption of 0.1% or below.

The protective layer may be also formed by an arbitrary method without restriction. For example, use can be made therefor of the vacuum deposition method, the sputtering method, the reactive sputtering method, the MBE (molecular beam epitaxy) method, the cluster ion beam method, the ion plating method, the plasma polymerization method (the high-frequency excitation ion plating method), the plasma CVD method, the laser CVD method, the heat CVD method, the gas source CVD method and the coating method.

The present invention will be described in greater detail below with reference to the following Examples, but the invention should not be construed as being limited thereto.

Synthesis of (1-2):

The dibromide a (0.52 g), the boric acid derivative b (0.14 g), Pd/C (0.1 g), triphenylphosphine (0.03 g) and sodium carbonate (0.5 g) were dissolved in diethylene glycol dimethyl ether (10 ml) and water (3 ml) and the resultant solution was heated under reflux for 8 hours. Next, it was diluted with methylene chloride (50 ml) and a 1 N aqueous solution of hydrochloric acid (50 ml) and the organic layer was washed with water. After drying and concentrating the organic layer, methanol (30 ml) was added to the residue. The white precipitate thus formed was taken up by filtration and dried to give 0.26 g of the compound (1-2) (weight-average molecular weight in terms of polystyrene Mw=8130).

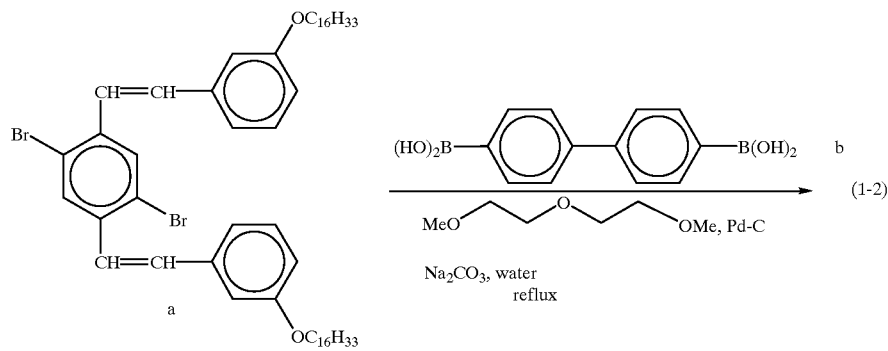

Synthesis of (1-16):

To the dibromide c (1.0 g), the diboric acid diester d (0.73 g), Pd(PPh$_3$)$_4$ (0.05 g) and sodium carbonate (0.55 g) added were toluene (30 ml) and water (10 ml). The mixture was refluxed with stirring under nitrogen stream and, after 5-hour lapse, was cooled to room temperature. Subsequently, chloroform (200 ml) and water (100 ml) were added to the resultant solution to separate an organic layer. The separated organic layer was washed with saturated brine (100 ml), and then dried and concentrated. The resultant matters was then subjected to reprecipitation with chloroform/methanol to obtain 1.05 g of yellow compound (1-16) (weight-average molecular weight in terms of polystyrene Mw=6200).

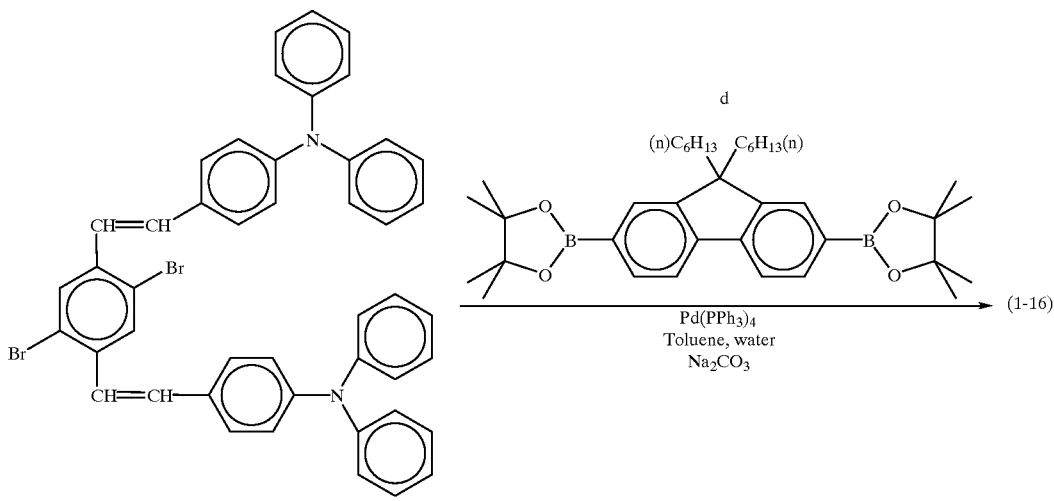

Preparation and Evaluation of EL Element:

COMPARATIVE EXAMPLE 1

MEH-PPV (40 mg) was dissolved in dichloroethane (2 ml) and then an ITO substrate, which had been washed, was spin-coated with the obtained solution. The organic thin layer thus formed had a thickness of about 130 nm. A patterned mask (luminescent area=5 mm×5 mm) was placed on the organic thin layer and then subjected to co-deposition with magnesium and silver (10:1) to give a thickness of 50 nm followed by the deposition with silver to give a thickness of 50 nm.

By using a Source Measure Unit Model 2400 (manufactured by Toyo Technika), a direct-current constant voltage was applied to the EL element to thereby cause luminescence. Then the luminance and the luminescence wavelength were measured respectively by using a Luminance Meter BM-8 (manufactured by Topcon) and a Spectrum Analyzer PMA-11 (manufactured by Hamamatsu Photonics). As a result, a reddish orange luminescence with the maximum luminance of 95 cd/m$^2$ was observed at 11 V and the λmax was 580 nm.

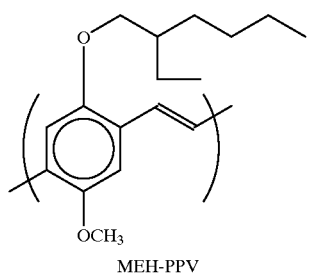

MEH-PPV

COMPARATIVE EXAMPLE 2

Polyphenylene (J. Am. Chem. Soc. 85 (1963) 454) (40 mg) was added to dichloroethane. However, it was hardly soluble in the solvent. By using the solution of a portion in which polyphenylene was somewhat dissolved, an EL element was constructed as in the same manner as in Comparative Example 1. As a result, little luminescence was observed.

COMPARATIVE EXAMPLE 3

Styryl compound c shown below (10 mg) and polycarbonate (bisphenol type, 30 mg) were dissolved in dichloroethane (2 ml). Then, an EL element was constructed and evaluated as in Comparative Example 1. Thus, a weak blue luminescence was observed at 20 V.

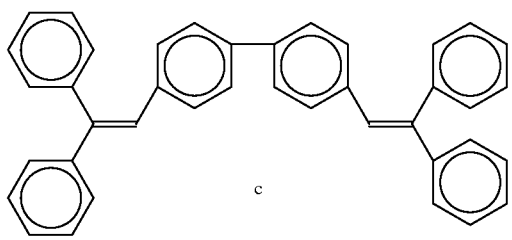

EXAMPLE 1

An EL element was constructed and evaluated in the same manner as that described in Comparative Example 1, except for using the conjugated polymer compound (1-2) according to the present invention in place of MEH-PPV. As a result, a blue luminescence of 139 cd/m$^2$ was observed at 13 V and the λmax was 465 nm.

EXAMPLE 2

The compound (1-2) (40 mg) was dissolved in dichloroethane (3 ml). Then an ITO substrate, which had been washed, was spin-coated with the obtained solution. Next, it was deposited successively with TAZ (1-phenyl-2-tbutylphenyl-5-biphenyl-1,3,4-triazole; 20 nm) and Alq (hydroxyquinoline aluminum complex; 40 nm). Then a cathode was formed thereon in the same manner as in Comparative Example 1 and the element thus formed was evaluated. As a result, a blue luminescence of 160 cd/m$^2$ was observed at 9 V.

Similar results could be obtained by using other compounds of the present invention.

As described above, use of the compounds of the present invention makes it possible to form EL elements with blue luminescence which achieve excellent luminescence.

The EL elements with the use of the compounds according to the present invention can exhibit blue luminescence with excellent luminescent properties.

Although the invention has been described in detail with reference to specific examples thereof, it will be apparent to one skilled in the art that various changes and modifications can be made therein without departing from the spirit and scope thereof.

What is claimed is:

1. A compound containing at least two units of a structure represented by the following general formula (1):

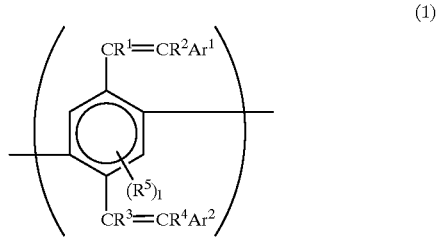

wherein $R^1$, $R^2$, $R^3$ and $R^4$ each represents a hydrogen atom or a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; $R^5$ represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; l is an integer of 0 to 2; and $Ar^1$ and $Ar^2$ each represents a substituted or unsubstituted aryl group or a substituted or unsubstituted heteroaryl group.

2. The compound according to claim 1, further containing at least two units of a structure represented by the following general formula (2):

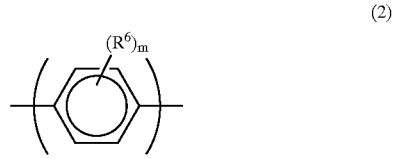

wherein $R^6$ represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; and m is an integer of from 0 to 4.

3. The compound according to claim 1, further containing at least two units of a structure represented by the following general formula (3):

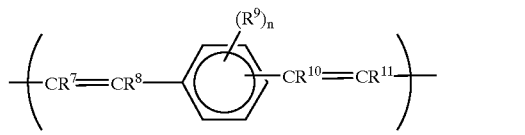

wherein $R^7$, $R^8$, $R^{10}$ and $R^{11}$ each represents a hydrogen atom or a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; $R^9$ represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; and n is an integer of 0 to 4.

4. The compound according to claim 1, further containing at least two units of a structure represented by the following general formula (4):

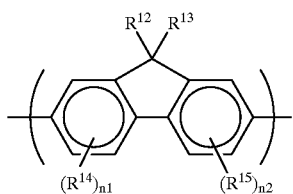

(4)

wherein $R^{12}$ and $R^{13}$ each represents a hydrogen atom or a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; $R^{14}$ and $R^{15}$ each represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; and n1 and n2 each is an integer of from 0 to 3.

5. The compound according to claim 1, wherein $Ar^1$ and $Ar^2$ comprise soluble substituents.

6. The compound according to claim 1, having a maximum luminescent wavelength (λmax) of the fluorescence emission spectrum of not more than 500 nm.

7. The compound according to claim 1, having a weight-average molecular weight of from 1,000 to 1,000,000.

8. An organic luminous element having an organic layer which comprises at least one compound selected from the group consisting of:

compounds containing at least two units of a structure represented by the following general formula (1):

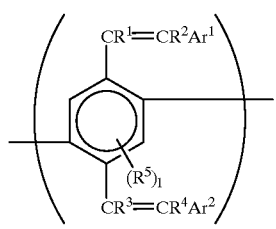

(1)

wherein $R^1$, $R^2$, $R^3$ and $R^4$ each represents a hydrogen atom or a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group); $R^5$ represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; l is an integer of 0 to 2; and $Ar^1$ and $Ar^2$ each represents a substituted or unsubstituted aryl group or a substituted or unsubstituted heteroaryl group; and compounds containing at least two units of a structure represented by the following general formula (a):

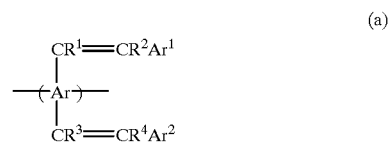

(a)

wherein $R^1$, $R^2$, $R^3$ and $R^4$ each represents a hydrogen atom or a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; and Ar, $Ar^1$ and $Ar^2$ each represents a substituted or unsubstituted aryl group or a substituted or unsubstituted heteroaryl group.

9. The organic luminous element according to claim 8, wherein the compounds containing at least two units of a structure represented by general formula (1) further contain at least two units of a structure represented by the following general formula (2):

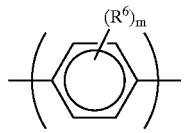

(2)

wherein $R^6$ represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; and m is an integer of from 0 to 4.

10. The organic luminous element according to claim 8, wherein the compounds containing at least two units of a structure represented by general formula (1) further contain at least two units of a structure represented by the following general formula (3):

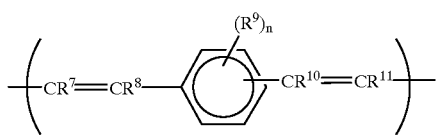

(3)

wherein $R^7$, $R^8$, $R^{10}$ and $R^{11}$ each represents a hydrogen atom or a substituent selected from the group consisting of a substituted or unsubstituted alkyl group, a substituted or unsubstituted alkenyl group, a substituted or unsubstituted alkynyl group, a substituted or unsubstituted sulfo group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; $R^9$ represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; and n is an integer of 0 to 4.

11. The organic luminous element according to claim 8, wherein the compounds containing at least two units of a structure represented by general formula (1) further contain at least two units of a structure represented by the following general formula (4):

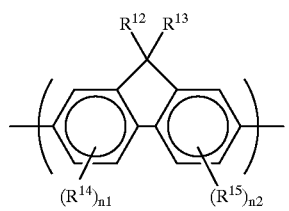

(4)

wherein $R^{12}$ and $R^{13}$ each represents a hydrogen atom or a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; $R^{14}$ and $R^{15}$ each represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; and n1 and n2 each is an integer of from 0 to 3.

12. The organic luminous element according to claim 8, wherein $Ar^1$ and $Ar^2$ on the compounds containing at least two units of a structure represented by general formula (1) comprise soluble substituents.

13. The organic luminous element according to claim 8, wherein the compounds containing at least two units of a structure represented by general formula (1) have a maximum luminescent wavelength ($\lambda$max) of the fluorescence emission spectrum of not more than 500 nm.

14. The organic luminous element according to claim 8, wherein the compounds containing at least two units of a structure represented by general formula (1) have a weight-average molecular weight of from 1,000 to 1,000,000.

15. The organic luminous element according to claim 8, wherein the organic layer has a laminated structure.

16. A process for producing a styryl compound, which comprises a step of forming a carbon—carbon bond in the presence of a palladium catalyst, to thereby prepare a compound containing at least two units of a structure represented by the following general formula (1):

$$\left( \begin{array}{c} CR^1 = CR^2Ar^1 \\ \phantom{xx} \\ (R^5)_l \\ CR^3 = CR^4Ar^2 \end{array} \right) \quad (1)$$

wherein $R^1$, $R^2$, $R^3$ and $R^4$ each represents a hydrogen atom or a substituent selected from the group consisting of a substituted or unsubstituted akyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group a substituted or unsubstituted aryloxy group, a halogen atom, a substituted or unsubstituted thiol group, a substituted or unsubstituted alkylthio group, a substituted or unsubstituted arylthio group, and a cyano group; $R^5$ represents a substituent selected from the group consisting of a substituted or unsubstituted alkyl group, a substituted or unsubstituted alkenyl group a substituted or unsubstituted alkynyl group, a substituted or unsubstituted aryl group, a substituted carbonl group, a substituted or unsubstituted amino group, a substituted or unsubstituted sulfonl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group; l is an integer of 0 to 2; and $Ar^1$ and $Ar^2$ each represents a substituted or unsubstituted aryl group or a substituted or unsubstituted heteroaryl group.

17. The compound according to claim 1, wherein $R^1$, $R^2$, $R^3$ and $R^4$ each represents a hydrogen atom or a substituent selected from the group consisting of a cyano group, a substituted or unsubstituted alkyl group, a substituted or unsubstituted aryl group, a substituted or unsubstituted heteroaryl group, a substituted carbonyl group and a halogen atom.

18. The compound according to claim 1, wherein $R^1$, $R^2$, $R^3$ and $R^4$ each represents a hydrogen atom or a substituent selected from the group consisting of a cyano group and a substituted or unsubstituted alkyl group.

19. The compound according to claim 1, wherein $R^1$, $R^2$, $R^3$ and $R^4$ each represent a hydrogen atom.

20. The compound according to claim 1, wherein each $R^5$ individually is selected from the group consisting of a substituted or unsubstituted alkyl group, a substituted or unsubstituted alkoxy group, a halogen atom, a substituted or unsubstituted aryl group, a substituted or unsubstituted heteroaryl group and a cyano group.

21. The compound according to claim 1, wherein each $R^5$ individually is selected from the group consisting of a substituted or unsubstituted alkyl group, a substituted or unsubstituted alkoxy group.

22. The compound according to claim 1, wherein each $R^5$ individually is selected from the group consisting of a substituted or unsubstituted alkoxy group.

23. The compound according to claim 2, wherein each $R^6$ individually is selected from the group consisting of a substituted or unsubstituted alkyl group, a substituted or unsubstituted alkoxy group, a halogen atom, a substituted or unsubstituted aryl group, a substituted or unsubstituted heteroaryl group and a cyano group.

24. The compound according to claim 2, wherein each $R^6$ individually is selected from the group consisting of a substituted or unsubstituted alkyl group, a substituted or unsubstituted alkoxy group.

25. The compound according to claim 2, wherein each $R^6$ individually is selected from the group consisting of a substituted or unsubstituted alkoxy group.

26. The compound according to claim 3, wherein $R^7$, $R^8$, $R^{10}$ and $R^{11}$ each represents a hydrogen atom or a substituent selected from the group consisting of a cyano group, a substituted or unsubstituted alkyl group, a substituted or unsubstituted aryl group, a substituted or unsubstituted heteroaryl group, a substituted carbonyl group and a halogen atom.

27. The compound according to claim 3, wherein $R^7$, $R^8$, $R^{10}$ and $R^{11}$ each represents a hydrogen atom or a substituent selected from the group consisting of a cyano group and a substituted or unsubstituted alkyl group.

28. The compound according to claim 3, wherein $R^7$, $R^8$, $R^{10}$ and $R^{11}$ each represent a hydrogen atom.

29. The compound according to claim 3, wherein each $R^9$ individually is selected from the group consisting of a substituted or unsubstituted alkyl group, a substituted or unsubstituted alkoxy group, a halogen atom, a substituted or unsubstituted aryl group, a substituted or unsubstituted heteroaryl group and a cyano group.

30. The compound according to claim 3, wherein each $R^9$ individually is selected from the group consisting of a substituted or unsubstituted alkyl group, a substituted or unsubstituted alkoxy group.

31. The compound according to claim 3, wherein each $R^9$ individually is selected from the group consisting of a substituted or unsubstituted alkoxy group.

32. The compound according to claim 4, wherein each $R^{12}$ and $R^{13}$ each represents a hydrogen atom or a substituent selected from the group consisting of a substituted or unsubstituted alkyl group, a substituted or unsubstituted aryl group, a substituted or unsubstituted alkenyl group and a substituted or unsubstituted alkynyl group.

33. The compound according to claim 4, wherein each $R^{12}$ and $R^{13}$ each represents a hydrogen atom or a substituent selected from the group consisting of a substituted or unsubstituted alkyl group.

34. The compound according to claim 4, wherein each $R^{12}$ and $R^{13}$ represents a substituent selected from the group consisting of a substituted or unsubstituted alkyl group.

35. The compound according to claim 4, wherein each $R^{14}$ and $R^{15}$ each represents a substituent selected from the group consisting of a substituted or unsubstituted alkyl group, a substituted or unsubstituted aryl group, a substituted or unsubstituted alkenyl group, a substituted or unsubstituted alkynyl group, a substituted or unsubstituted alkoxy group and a cyano group.

36. The compound according to claim 4, wherein each $R^{14}$ and $R^{15}$ each represents a substituent selected from the group consisting of a substituted or unsubstituted alkyl group and a substituted or unsubstituted aryl group.

37. The compound according to claim 4, wherein each $R^{14}$ and $R^{15}$ each represents a substituent selected from the group consisting of a substituted or unsubstituted alkyl group.

38. The compound according to claim 8, wherein $R^1$, $R^2$, $R^3$ and $R^4$ each represents a hydrogen atom or a substituent selected from the group consisting of a cyano group, a substituted or unsubstituted alkyl group, a substituted or unsubstituted aryl group, a substituted or unsubstituted heteroaryl group, a substituted carbonyl group and a halogen atom.

39. The compound according to claim 8, wherein $R^1$, $R^2$, $R^3$ and $R^4$ each represents a hydrogen atom or a substituent selected from the group consisting of a cyano group and a substituted or unsubstituted alkyl group.

40. The compound according to claim 8, wherein $R^1$, $R^2$, $R^3$ and $R^4$ each represent a hydrogen atom.

41. The compound according to claim 8, wherein each $R^5$ individually is selected from the group consisting of a substituted or unsubstituted alkyl group, a substituted or unsubstituted alkoxy group, a halogen atom, a substituted or unsubstituted aryl group, a substituted or unsubstituted heteroaryl group and a cyano group.

42. The compound according to claim 8, wherein each $R^5$ individually is selected from the group consisting of a substituted or unsubstituted alkyl group, a substituted or unsubstituted alkoxy group.

43. The compound according to claim 8, wherein each $R^5$ individually is selected from the group consisting of a substituted or unsubstituted alkoxy group.

44. The compound according to claim 9, wherein each $R^6$ individually is selected from the group consisting of a substituted or unsubstituted alkyl group, a substituted or unsubstituted alkoxy group, a halogen atom, a substituted or unsubstituted aryl group, a substituted or unsubstituted heteroaryl group and a cyano group.

45. The compound according to claim 9, wherein each $R^6$ individually is selected from the group consisting of a substituted or unsubstituted alkyl group, a substituted or unsubstituted alkoxy group.

46. The compound according to claim 9, wherein each $R^6$ individually is selected from the group consisting of a substituted or unsubstituted alkoxy group.

47. The compound according to claim 10, wherein $R^7$, $R^8$, $R^{10}$ and $R^{11}$ each represents a hydrogen atom or a substituent selected from the group consisting of a cyano group, a substituted or unsubstituted alkyl group, a substituted or unsubstituted aryl group, a substituted or unsubstituted heteroaryl group, a substituted carbonyl group and a halogen atom.

48. The compound according to claim 10, wherein $R^7$, $R^8$, $R^{10}$ and $R^{11}$ each represents a hydrogen atom or a substituent selected from the group consisting of a cyano group and a substituted or unsubstituted alkyl group.

49. The compound according to claim 10, wherein $R^7$, $R^8$, $R^{10}$ and $R^{11}$ each represent a hydrogen atom.

50. The compound according to claim 10, wherein each $R^9$ individually is selected from the group consisting of a substituted or unsubstituted alkyl group, a substituted or unsubstituted alkoxy group, a halogen atom, a substituted or unsubstituted aryl group, a substituted or unsubstituted heteroaryl group and a cyano group.

51. The compound according to claim 10, wherein each $R^9$ individually is selected from the group consisting of a substituted or unsubstituted alkyl group, a substituted or unsubstituted alkoxy group.

52. The compound according to claim 10, wherein each $R^9$ individually is selected from the group consisting of a substituted or unsubstituted alkoxy group.

53. The compound according to claim 11, wherein each $R^{12}$ and $R^{13}$ each represents a hydrogen atom or a substituent selected from the group consisting of a substituted or unsubstituted alkyl group, a substituted or unsubstituted aryl group, a substituted or unsubstituted alkenyl group and a substituted or unsubstituted alkynyl group.

54. The compound according to claim 11, wherein each $R^{12}$ and $R^{13}$ each represents a hydrogen atom or a substituent selected from the group consisting of a substituted or unsubstituted alkyl group.

55. The compound according to claim 11, wherein each $R^{12}$ and $R^{13}$ represents a substituent selected from the group consisting of a substituted or unsubstituted alkyl group.

56. The compound according to claim 11, wherein each $R^{14}$ and $R^{15}$ each represents a substituent selected from the group consisting of a substituted or unsubstituted alkyl group, a substituted or unsubstituted aryl group, a substituted or unsubstituted alkenyl group, a substituted or unsubstituted alkynyl group, a substituted or unsubstituted alkoxy group and a cyano group.

57. The compound according to claim 11, wherein each $R^{14}$ and $R^{15}$ each represents a substituent selected from the group consisting of a substituted or unsubstituted alkyl group and a substituted or unsubstituted aryl group.

58. The compound according to claim 11, wherein each $R^{14}$ and $R^{15}$ each represents a substituent selected from the group consisting of a substituted or unsubstituted alkyl group.

59. A compound containing at least two units of a structure represented by the following general formula (5):

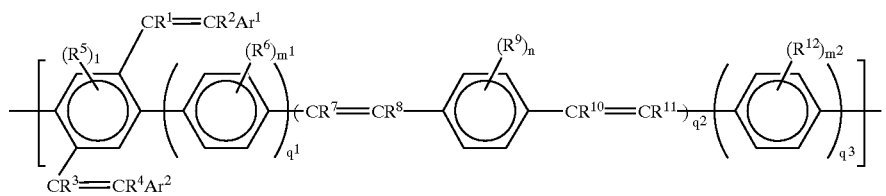

(5)

wherein $R^1$, $R^2$, $R^3$ and $R^4$ each represents a hydrogen atom or a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group;

R$^5$ represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group;

R$^6$ and R$^{12}$ each represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group;

R$^7$, R$^8$, R$^{10}$ and R$^{11}$ each represents a hydrogen atom or a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group;

R$^9$ represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group;

l is an integer of 0 to 2;

m$^1$ and m$^2$ each is an integer of from 0 to 4;

q$^1$, q$^2$ and q$^3$ each is an integer of 0 or more;

n is an integer of 0 to 4; and

Ar$^1$ and Ar$^2$ each represents a substituted or unsubstituted aryl group or a substituted or unsubstituted heteroaryl group.

60. An organic luminous element having an organic layer which comprises at least one compound containing at least two units of a structure represented by the following general formula (5):

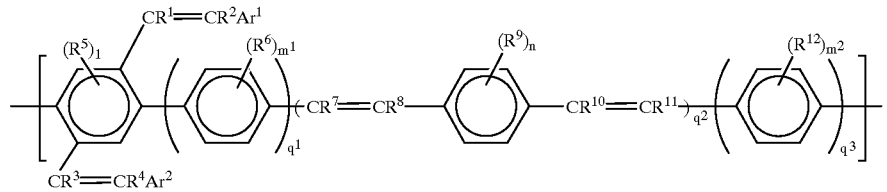

(5)

wherein R$^1$, R$^2$, R$^3$ and R$^4$ each represents a hydrogen atom or a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group;

R$^5$ represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group;

R$^6$ and R$^{12}$ each represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group;

$R^7$, $R^8$, $R^{10}$ and $R^{11}$ each represents a hydrogen atom or a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group;

$R^9$ represents a substituent selected from the group consisting of a substituted or unsubstituted alkyl group, a substituted or unsubstituted alkenyl group, a substituted or unsubstituted alkynyl group, a substituted or unsubstituted aryl group, a substituted carbonyl group, a substituted or unsubstituted amino group, a substituted or unsubstituted sulfonyl group, a substituted or unsubstituted sulfo group, a substituted or unsubstituted carboxyl group, a substituted or unsubstituted heterocyclic group, a hydroxyl group, a substituted or unsubstituted alkoxy group, a substituted or unsubstituted aryloxy group, a halogen atom, a substituted or unsubstituted thiol group, a substituted or unsubstituted alkylthio group, a substituted or unsubstituted arylthio group, and a cyano group;

l is an integer of 0 to 2;

$m^1$ and $m^2$ each is an integer of from 0 to 4;

$q^1$, $q^2$ and $q^3$ each is an integer of 0 or more;

n is an integer of 0 to 4; and $Ar^1$ and $Ar^2$ each represents a substituted or unsubstituted aryl group or a substituted or unsubstituted heteroaryl group.

* * * * *